United States Patent [19]

Andersson

[11] 4,395,331

[45] Jul. 26, 1983

[54] APPARATUS FOR PRESSING LIQUID OUT OF MATERIAL CONTAINING LIQUID

[75] Inventor: Harald Andersson, Säffle, Sweden

[73] Assignee: AB Saffle Gjuteri and Mekaniska Verkstad, Saffle, Sweden

[21] Appl. No.: 352,866

[22] Filed: Feb. 26, 1982

Related U.S. Application Data

[63] Continuation of Ser. No. 154,400, Jul. 9, 1979, abandoned.

[51] Int. Cl.³ .............................................. B01D 33/04

[52] U.S. Cl. .................................... 210/329; 100/118; 100/152; 210/350; 210/400

[58] Field of Search ............................... 100/117-120, 100/150-154; 210/324, 328-330, 350, 351, 400, 401, 314, 316-318

[56] References Cited

U.S. PATENT DOCUMENTS 785,876 3/1905 Gropp ................................ 100/150

4,121,967 10/1978 Reinhall ............................ 100/117

4,211,162 7/1980 Bastgen .............................. 100/120

FOREIGN PATENT DOCUMENTS 28844 6/1957 Finland .

*Primary Examiner*—Ivars C. Cintins

*Attorney, Agent, or Firm*—Murray and Whisenhunt

[57] ABSTRACT

An apparatus for pressing liquid out of suspensions containing liquid, comprising a screw feeder (5) adapted to feed the suspensions towards a dewatering zone (2) in which there are disposed two converging endless filter members (20, 21) adapted to be driven round a pair of back and front breaking rollers (**18*a*, 18*b*). The pressing angle (α) between the filter members can be varied as can the speed of the filter members in relation to the material which is fed forwards in order to achieve an optimum flow resistance for each suspension. In certain cases, this can be very high. A worm wheel (13) is provided to prevent material from retreating in the screw thread (11**).

According to one form of embodiment, two or more dewatering zones are disposed in series one after the other, thus further increasing the possibilities for achieving optimum dewatering conditions.

12 Claims, 3 Drawing Figures

APPARATUS FOR PRESSING LIQUID OUT OF MATERIAL CONTAINING LIQUID

This is a continuation application of Ser. No. 154,400, filed July 9, 1979, now abandoned.

TECHNICAL FIELD

The present invention relates to an apparatus for pressing liquid out of material containing liquid, primarily fibrous suspensions, comprising a screw feeder adapted to feed the material in the axial direction towards a zone where the liquid is pressed out of the material and two converging endless filter members are adapted to be driven round a back and a front breaking roller. For the sake of simplicity, the expressions "to dewater" and dehydrations" are used, but this does not mean any restriction of the application of the invention to material containing water only. The invention can be used to advantage for materials containing other liquids than water, for example, oils, emulsions etc.

BACKGROUND ART

It has long been known, for example through the German Patent Specification No. 317 788, to dewater and concentrate for example suspensions containing fibre by means of a substantially tubular, conically ending filter through which the suspension is fed with a screw. Apparatuses the method of working of which is based on this principle are still manufactured to a considerable extent, among others by Säffle Gjuteri & Mek. Verkstads AB and are marketed under the trade name DESICCATOR. A disadvantage of these known apparatuses, however, is that the dewatering zone does not offer the optimum flow resistance to different kinds of suspensions. Various methods of varying the flow resistance have therefore been proposed. Among others it was previously proposed through French Patent Specification No. 572 324 to vary the pressing angle and to exchange the substantially tubular, conical filter for two converging endless filter members adapted to be driven round a back and a front drive roller. This type of apparatus has been further improved, French Patent Specification No. 1 130 181, but has nevertheless not acquired any importance in comparison with dewaterers of the DESICCATOR type. One reason for this may be the circumstance that the optimum flow resistance cannot be used if this is high, because the material then tends to retreat into the thread of the feed screw.

STATEMENT OF INVENTION

A first object of the invention is therefore to provide an apparatus of the kind referred to at the beginning, with which the flow resistance in the dewatering zone can be regulated, while at the same time material is prevented from retreating into the screw thread even when the flow resistance in the dewatering zone is comparatively high.

Other objects of the invention are to produce a robust construction with low installation and maintenance costs and with low power consumption.

These and other objects can be achieved in that at least the one filter member is variably adjustable to vary the pressing angle, that is to say the angle between the converging filter members, between 0° and 30°, preferably between 0° and 25°, and that said filter member is adapted to be able to be driven round in its path round the breaking rollers at variable speed, including a speed which is lower than the speed of the dewatered material, with the object of achieving an optimum flow resistance the use of which is rendered possible, even when the flow resistance is high, by means of a worm wheel with such a shape that at least one of its teeth always lies in sealing engagement with the feed screw, in its thread, as a result of which material is prevented from retreating into the thread because of the high flow resistance in the dewatering zone. The filter member may appropiriately comprise a filter cloth with a perforated supporting base.

An object of one form of development of the invention is to further improve the possibilities for regulating the flow resistance in the dewatering zone. This can be achieved in that the suspension or other material which is to be dewatered is exposed to ever harder pressing pressure in two or more following, converging filter members. By this means, the possibilities are improved for selecting a suitable pressing angle for each suspension. Moreover, in an introductory dewatering zone, the suspension can be given a more careful treatment, while a more intensive pressing of the material is first effected in a following zone, which further improves the regulating possibilities. This can also involve lower reject losses. Lower reject lossed can likewise be obtained as a result of the fact that the filter cloth in an introductory dewatering zone is denser than in a later zone.

The pressing angle in the first zone may be fixed, while the pressing angle in the final zone is preferably variable. According to an alternative form of embodiment, however, the pressing angle in the introductory stage may likewise be variable.

According to another aspect of the invention, the speed of the filter cloth is different in different dewatering zones. Thus the speed of the filter cloth may be higher in an introductory zone, for example, than in a later zone.

According to another aspect of the invention, the apparatus comprises a plurality of similar, series-coupled filter members, as a result of which the apparatus can be built up of a number of modules, which can reduce the cost of manufacture and stock-keeping considerably.

Other features and aspects of all the advantage of the invention will be apparent from the following description of two preferred embodiments.

BRIEF DESCRIPTION OF THE DRAWINGS

In the following description of the preferred forms of embodiments, reference will be made to the accompanying drawings in which.

In the figures, only those details have been shown—in certain cases only diagrammatically—which are required for an understanding of the invention, while other details have been omitted so that what is essential may be better emphasized.

DESCRIPTION OF PREFERRED FORMS OF EMBODIMENT

Figure 1:
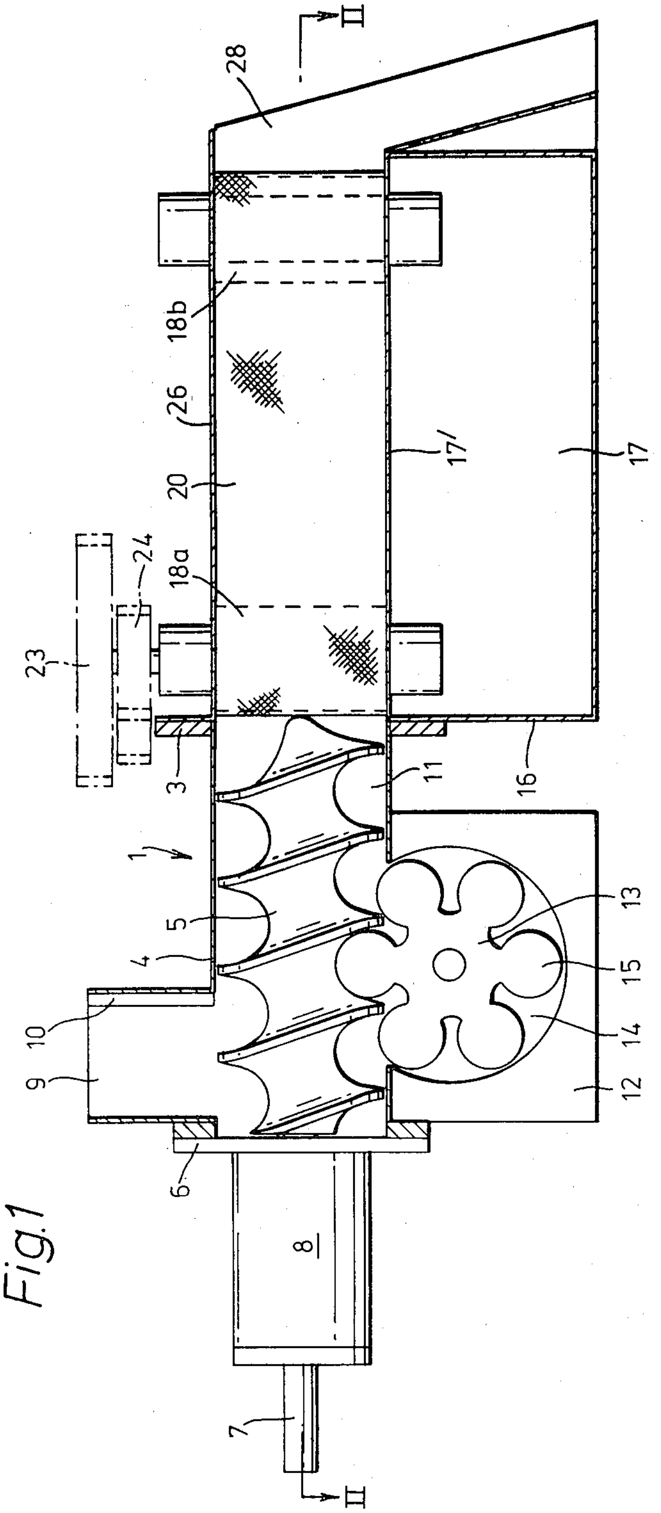
FIG. 1 is a vertical longitudinal section through an apparatus according to a firs preferred embodiment of the invention.
Figure 2:
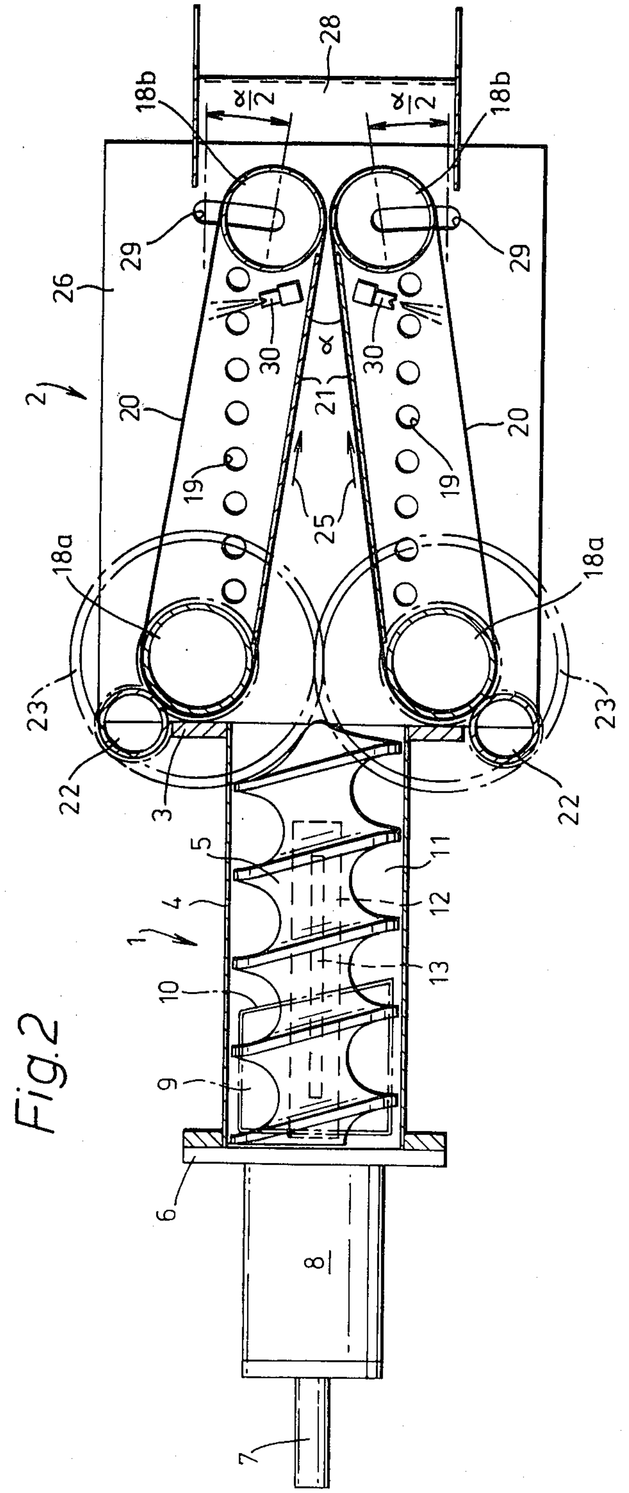
FIG. 2 is a horizontal section II—II in FIG. 1.

The apparatus illustrated in FIGS. 1–2 consists of two main parts, namely a feed part 1 and a dewatering part 2 in a dewatering zone. The feed part 1 and the dewatering part 2 are separated from one another by a partition 3. The feed part 1 comprises a cylindrical feed housing 4 and a feeder screw 5 mounted in this. The feed housing 4 is bounded at the back by an end wall 6. The shaft 7 of the feeder screw extends with a sealing action through the end wall 6 and is mounted in double bearings in a bearing housing 8. The feed part has an inlet 9 for the material which is to be dewatered. In the normal case, this is constituted by a fibre suspension, for which reason this is referred to hereinafter. The inlet 9 comprises a front gable 10 which is set obliquely like the thread pitch of the feeder screw 5. The feed screw 5 has a cylindrical thread 11 with an even pitch with a rounded bottom.

Disposed under the feeder screw is a worm housing 12 which is tightly fitted to the feed housing 4. The worm housing contains a worm wheel 13 which is mounted with a sealing action in a worm-wheel-chamber 14 in the worm housing 12, so that material cannot pass the worm wheel through the worm housing. Furthermore, the teeth 15 of the worm wheel have a circular cylindrical shape, which is selected so that at least one of the teeth always lies in tight engagement against the feeder screw 5, in its thread 11. By this means, material is prevented from retreating into the thread 11.

The feed housing 4 is tightly connected to the partition 3 as well as a stand 16 in the dewatering part 2. The stand 16 constitutes a holder for a reject liquid trough 17 and for two pairs of vertically mounted, standard drilled breaking roller 18*a* and 18*b* respectively. The reject liquid trough 17 is covered by a plate 17′ which is perforated with a dewatering hole 19. Mounted over the back and front breaking rollers 18*a* and 18*b* respectively in each pair of breaking rollers is a vertically disposed endless filter cloth or wire 20. The parts of the wire which face on another are supported by a perforated supporting plate 21. All the breaking rollers are rotatable about their respective axes.

Two rubberized rollers 22 are driven via gear wheels 23 and 24 or by other means by means of a change speed gear and a geared motor. The rubberized rollers 22 are pressed against the wires 20 with reference to the back breaking rollers 18*a* so that the wires 20 are conveyed forwards in the direction of the arrows 25. The speeds of the two wires 20 are equally great but preferably lower than the speed of the dewatered filter cake. By this means, an extra variable flow resistance is created. The back breaker rollers 18*a* are also adapted to be able to be positively driven by means of a chain drive or correspondingly via the gear wheel 23. Above the vertically disposed wires is a horizontal cover plate 26 which is parallel to the cover 17′ of the reject tank 17. An outlet for the dewatered and pressed filter cake is designated by 28 while a pair of blast nozzles for cleaning the wires is designated by 30.

As can be seen from FIG. 2, the filter members—which consist of the wires 20 with the supporting plates 21 behind them—are arranged so that they converge towards one another in the feed direction of the suspension. According to the invention, the two front breaking rollers 18*b* can be moved away from and towards one another along a circular line the centre of which coincides with the centre of the axes of the back breaking rollers. In order to guide this displacement, slots 29 or corresponding guide means are provided in the cover 17′ of the reject-liquid trough 17 and in the cover plate 26. In FIG. 2, the front breaking rollers 18*b* are shown brought together to the maximum which gives the maximum flow resistance. The separation of the front breaking rollers 18*b* is counteracted by restraining members, not shown, which may consist of mechanical springs, for example. It is also possible to adjust the nip between the end positions which are determined by the slot 29 or a corresponding guide member. This can be effected manually or hydraulically, for example. According to the form of embodiment, the pressing angle $\alpha$ can be varied in this manner between 0° and 18°. The invention is not, however, restricted to 18° as a maximum pressing angle. Thus by adjusting the pressing angel between the filter members, an optimum flow resistance can be obtained, which can be used even when it is high because the suspension is prevented from retreating into the thread by means of the worm wheel 13.

Figure 3:
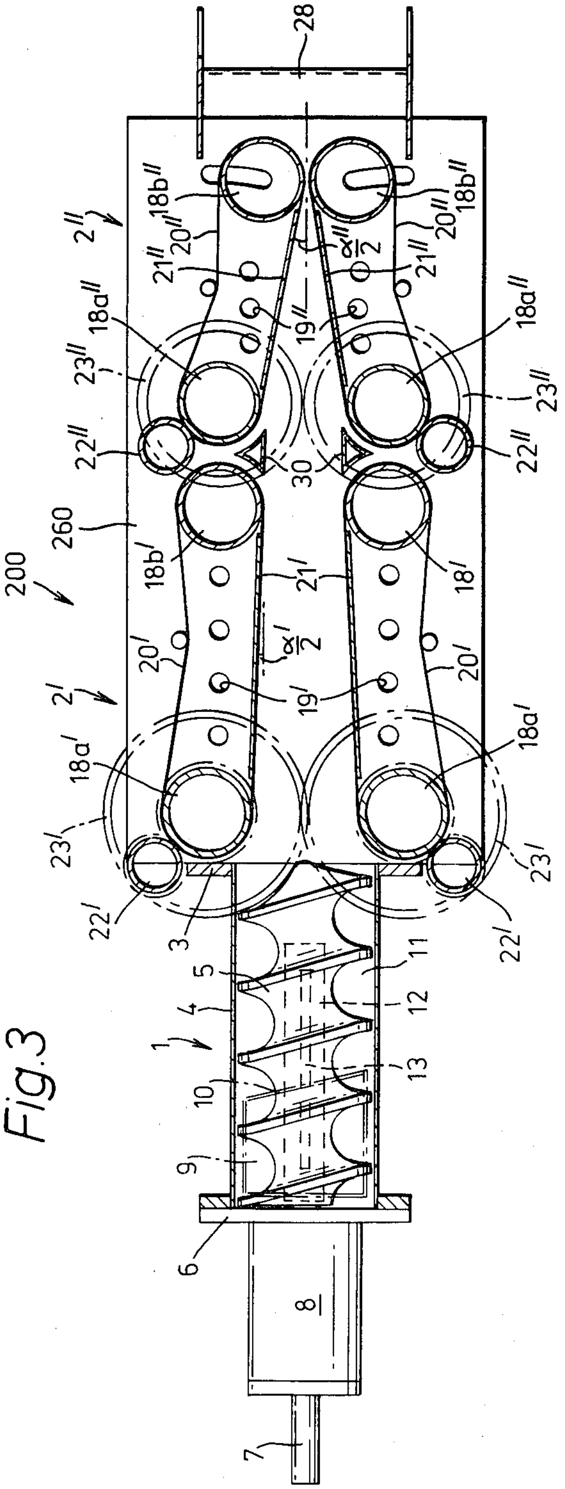
FIG. 3 is a horizontal section through an apparatus according to another preferred form of embodiment of the invention.

In FIG. 3, the details which correspond to those in FIGS. 1 and 2 have been given the same references. The feed part 1 of the apparatus is completely identical with that which is shown in FIGS. 1–2 and therefore comprises a feed housing 4 with a feeder screw 5, a worm wheel 13 and an inlet 9 for the suspension or other material which is to be dewatered.

The feed part 1 is separated by a partition 3 from a dewatering part 200 which comprises two series-coupled dewatering zones 2′ and 2″. The dewatering part 200 is connected, in a sealing manner to the partition 3 and like the dewatering part 2 in the apparatus of FIGS. 1–2 comprises a stand, not shown and a reject liquid trough disposed under a horizontal cover plate 260.

The components illustrated in FIG. 3 in the introductory zone 2′ in the dewatering part 200 comprise a pair of endless wires 20′ with perforated supporting plates 21′ situated behind them. The drainage hole in the cover plate 260 is designated 19′. Upper and back breaking rollers for the wires 20′ are designated by 19*a′* and 18*b′* respectively, while a pair of rubberized rollers pressed against the wires 20′ are designated by 22′ and a pair of driving gear wheels are designated by 23′.

Corresponding details in the final dewatering part 2″ have been provided with the same references as in the first dewatering part 2′ but with a ″ sign instead of a ′ sign. An outlet for dewatered filter cake is designated by 28. Disposed between the two dewatering zones 2′ and 2″, more specifically between the back breaking roller 18*b′* in the first zone 2′ and the front breaking roller 18*a′* in the next zone 2″ is a pair of guide plates 30 for the partially dewatered material.

According to this form of embodiment, the pressing angle $\alpha'$ in the first zone is fixed which means that the back breaking rollers 18*b* in this zone cannot be displaced. On the other hand, the back breaking roller 18″ in the final zone 2″ can be displaced in the slot 29″ so that the pressing angle $\alpha''$ in this zone can be varied.

The first wires 20′ preferably have a smaller size of mesh than the following wires 20″. Furthermore, the speed of the front wires 20′ is preferably greater than the speed of the later wires 20″.

I claim:

1. Apparatus for pressing liquid out of liquid-containing material, said apparatus comprising (a) dewatering means for dewatering said material, said dewatering means including at least one pair of converging, endless, vertically disposed filter members each including (i) a back and a front braking roller each roller having a vertical axis, (ii) a perforated support base, (iii) a filter supported on said support base, (iv) drive means for driving said filter at a variable speed around said braking rollers, and (v) adjustment means for rendering at least one of said filter members variably adjustable to vary the pressing angle between that filter member and the other filter member of the pair, (b) a horizontally disposed screw feeder means for feeding said material in an axial, horizontal direction towards said dewatering means, and (c) toothed worm wheel means for preventing material from retreating into the thread of said screw feeder means as a result of high flow resistance in the dewatering means by maintaining at least one tooth of said toothed worm wheel means in sealing engagement with said screw feeder means in the thread thereof.

2. Apparatus of claim 1, wherein said drive means drive the filter at a speed which is lower than the speed of the material passing thereinbetween.

3. Apparatus as claimed in claim 1 or 2, wherein at least one of said filter members is variably adjustable by displacement of the front braking roller thereof along a circular line, the center of which coincides with the center of the back braking roller.

4. Apparatus as claimed in claim 3, wherein the thread of the feeder screw has a rounded bottom, and the teeth of the worm wheel have a corresponding circular cylindrical shape.

5. Apparatus as claimed in either of claims 1 or 2, wherein at least two pairs of converging filter members are disposed in series in successive dewatering zones.

6. Apparatus as claimed in claim 5, wherein the pressing angles of different pairs of converging filter members are different.

7. Apparatus as claimed in claim 6, wherein the pressing angle of the downstream dewatering zone is greater than of the upstream dewatering zone.

8. Apparatus as claimed in claim 7, wherein the filter cloths of the downstream dewatering zone have a greater mesh size than of the upstream dewatering zone.

9. Apparatus as claimed in claim 8, wherein said drive means drive the filter in the downstream dewatering zone at a lower speed than the filter in the upstream dewatering zone.

10. Apparatus of claim 9, wherein the apparatus includes two dewatering zones.

11. Apparatus as claimed in claim 9, wherein the series-coupled filter members are alike.

12. Apparatus as claimed in claim 9, wherein the pressing angle in the upstream dewatering zone is fixed and the pressing angle in the downstream dewatering zone is variable.

* * * * *